(12) United States Patent  
Kashibuchi

(10) Patent No.: US 10,438,402 B2  
(45) Date of Patent: Oct. 8, 2019

(54) IMAGE PROCESSING APPARATUS, IMAGE PROCESSING SYSTEM, IMAGE PROCESSING METHOD, AND STORAGE MEDIUM

(71) Applicant: CANON KABUSHIKI KAISHA, Tokyo (JP)

(72) Inventor: Yoichi Kashibuchi, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/892,303

(22) Filed: Feb. 8, 2018

(65) Prior Publication Data

US 2018/0232945 A1 Aug. 16, 2018

(30) Foreign Application Priority Data

Feb. 16, 2017 (JP) .................................. 2017-027294

(51) Int. Cl.
| | |
|---|---|
| G06T 15/30 | (2011.01) |
| G06T 5/00 | (2006.01) |
| H04N 13/00 | (2018.01) |
| G06T 19/00 | (2011.01) |

(52) U.S. Cl.
CPC .............. *G06T 15/30* (2013.01); *G06T 5/006* (2013.01); *G06T 5/008* (2013.01); *H04N 13/00* (2013.01); *G06T 19/006* (2013.01); *G06T 2207/20212* (2013.01)

(58) Field of Classification Search
None
See application file for complete search history.

(56) References Cited

U.S. PATENT DOCUMENTS

| | | | | |
|---|---|---|---|---|
| 2007/0295814 A1* | 12/2007 | Tanaka | ............... | G06K 7/10722 235/454 |
| 2010/0013947 A1* | 1/2010 | Oikawa | .................. | G03B 13/36 348/222.1 |
| 2012/0242677 A1* | 9/2012 | Kobayashi | ............. | G09G 3/003 345/589 |

(Continued)

FOREIGN PATENT DOCUMENTS

WO 2011/121841 A1 10/2011

OTHER PUBLICATIONS

Unity Technologies, "Lighting Overview", Sep. 3, 2016, Unity Technologies (Year: 2016).*

*Primary Examiner* — YuJang Tswei  
(74) *Attorney, Agent, or Firm* — Canon U.S.A., Inc. IP Division

(57) ABSTRACT

An image processing apparatus includes a correction unit configured to execute shading correction on a first captured image and a second captured image respectively captured by a first image capturing unit and a second image capturing unit having different optical axes, respectively corresponding to a left eye and a right eye of a user, to generate a first display image and a second display image respectively. A clipping unit clips the first display image and the second display image to each include a three-dimensional view area where the user views the object in three dimensions. The correction unit executes the shading correction with a position of a center of the three-dimensional view area of the first display image and the second display image set to be at a center.

19 Claims, 12 Drawing Sheets

(56) References Cited

U.S. PATENT DOCUMENTS

| | | | |
|---|---|---|---|
| 2012/0313946 A1* | 12/2012 | Nakamura | G06F 3/04815 345/426 |
| 2013/0100504 A1* | 4/2013 | Suwa | G06K 9/20 358/474 |
| 2016/0048230 A1* | 2/2016 | Shimoda | G06T 19/006 345/633 |
| 2018/0084208 A1* | 3/2018 | Kim | H04N 5/3572 |

* cited by examiner

IMAGE PROCESSING APPARATUS, IMAGE PROCESSING SYSTEM, IMAGE PROCESSING METHOD, AND STORAGE MEDIUM

BACKGROUND OF THE INVENTION

Field of the Invention

The present invention relates to a technique of correcting an image captured by an image capturing unit.

Description of the Related Art

In recent years, mixed reality (MR) has been studied. The MR presents to a user information on a virtual space, superimposed on a physical space in real time. More specifically, a combined image, in which a computer graphics (CG) is partially or entirely superimposed on a real image, is displayed. The real image is captured by two image capturing units (such as video cameras) corresponding to both eyes. The CG is an image of a virtual space corresponding to a position/orientation of the image capturing units.

The two image capturing units used in this technique are arranged with left-right parallax. Captured images obtained by imaging optical systems of the two image capturing units have the same or similar characteristics. This facilitates visual fusion to ensure more natural three-dimensional (3D) view. The two imaging optical systems generally having the same optical characteristics regarding vignetting and the like are used. However, the systems cannot be completely free of individual differences. In view of this, WO11/121841 discusses a correction method for mitigating such individual differences between the imaging optical systems. This method involves shading correction for correcting vignetting. More specifically, the correction is performed based on a view angle position to achieve uniform brightness over the entire captured images. Thus, uniform brightness can be achieved between clipped images obtained by clipping any positions of left and right captured images.

SUMMARY OF THE INVENTION

The shading correction according to the method discussed in WO11/121841 is performed with optical axes of the imaging optical systems of the image capturing units each set to be at the center. Display images, with different view angles, to be monitored are clipped from the captured images captured by the two image capturing units with different optical axes. Unfortunately, this configuration fails to match the center of the display image to be monitored with the center of the imaging optical system. This results in a difference in brightness distribution between images captured by the two image capturing units.

The present invention features reducing a difference in light quantity distribution between display images generated from images captured by two image capturing units.

An image processing apparatus according an aspect of the present invention includes a correction unit configured to execute shading correction on a first captured image and a second captured image respectively captured by a first image capturing unit and a second image capturing unit having different optical axes, respectively corresponding to a left eye and a right eye of a user, to generate a first display image and a second display image respectively, a clipping unit configured to clip areas of the first display image and the second display image at different relative positions with respect to the optical axes from the first captured image and the second captured image to generate a clipped first display image and a clipped second display image respectively, and a generation unit configured to combine a virtual object with the clipped first display image and the clipped second display image to generate a first combined image and a second combined image. The clipping unit clips the first display image and the second display image to each include a three-dimensional view area where the user views the object in three dimensions. The correction unit executes the shading correction with a position of a center of the three-dimensional view area of the first display image and the second display image set to be at a center.

Further features of the present invention will become apparent from the following description of exemplary embodiments with reference to the attached drawings.

DESCRIPTION OF THE EMBODIMENTS

Figure 1:
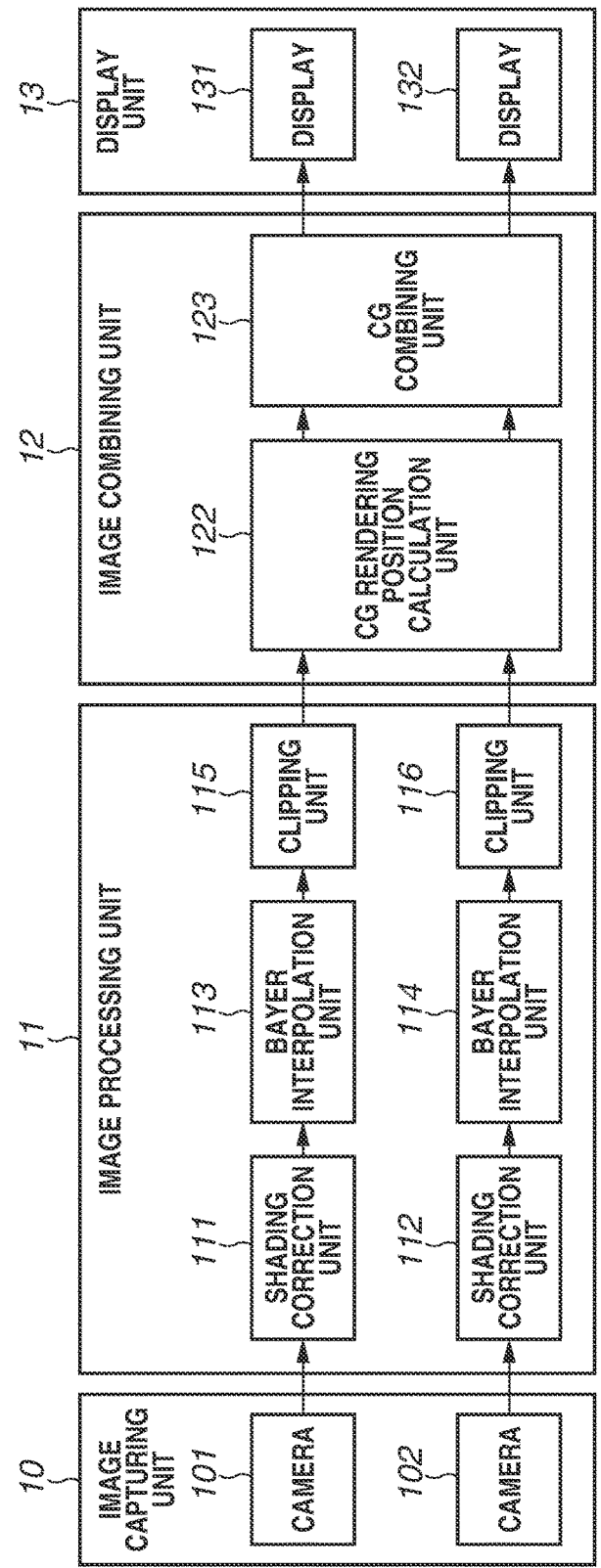
FIG. 1 is a diagram illustrating a configuration of an image processing system according to a first exemplary embodiment.

A first exemplary embodiment of the present invention is described in detail below with reference to the drawings. FIG. 1 is a diagram illustrating a configuration of an image processing system according to the present exemplary embodiment. The image processing system according to the present exemplary embodiment includes a head-mounted image display device and an image processing apparatus. The image display device is known as a head-mounted display (HMD). The image processing apparatus is in wired or wireless connection to the HMD.

The HMD includes an image capturing unit 10 and a display unit 13. The image capturing unit 10 includes cameras and generates captured images. The display unit 13 displays display images on displays. The image processing apparatus includes an image processing unit 11 and an image combining unit 12. The image processing unit 11 executes image processing on the captured images to generate the display images. The image combining unit 12 calculates a superimposed position of computer graphics (CG) data on a virtual object in accordance with the content of the display image, and combines the CG data with the display image.

The configuration described herein has the image processing unit 11 and the image combining unit 12 provided in the image processing apparatus that is provided separately from the HMD. The HMD can have all the functions to be capable of standalone operations. A user wearing the HMD on his or her head can monitor an image obtained by superimposing a CG on an image of the physical world through the displays in the HMD. Thus, the user can experience mixed reality (MR) featuring real-time fusion between the reality and the virtual reality.

The image processing apparatus has a hardware configuration including a central processing unit (CPU), a read only memory (ROM), a random access memory (RAM), and a hard disk drive (HDD). The CPU executes a program stored in the ROM or the HDD to implement various functional configurations and processing in a flowchart. The RAM includes a storage area that functions as a work area onto which a program is loaded to be executed by the CPU. The ROM includes a storage area that stores therein a program and the like executed by the CPU. The HDD includes a storage area that stores therein various programs used for the CPU to execute processing, as well as various types of data including data on a threshold.

The image capturing unit 10 includes cameras 101 and 102 each including an image sensor such as a charged coupled device (CCD) and a complementary metal oxide semiconductor (COMS), and an imaging optical system. The image capturing unit 10 captures an image of an object in a physical space for each of frames at a predetermined interval. The camera 101 captures an image of the physical space for the left eye of the user, whereas the camera 102 captures an image of the physical space for the right eye of the user. The HMD according to the present exemplary embodiment employs parallel viewing for capturing images with parallax. The cameras 101 and 102, for the parallel viewing, are arranged with their optical axes extending in parallel with each other while being separated from each other by a predetermined distance (base line length), as will be described in detail below.

The image processing unit 11 includes shading correction units 111 and 112, Bayer interpolation units 113 and 114, and clipping units 115 and 116. The shading correction units 111 and 112 apply a gain corresponding to a view angle position to captured images captured by the cameras 101 and 102 to execute shading correction processing for correcting vignetting of the imaging optical systems. Thus, light quantity distribution described below is achieved. The Bayer interpolation units 113 and 114 execute Bayer interpolation processing of generating an RGB signal from Bayer data based on a Bayer array, which is output from the image sensor. The clipping units 115 and 116 each execute clipping processing of clipping a captured image at a position and of a size corresponding to a vergence distance, which will be described below, to generate a three-dimensionally viewable display image.

In the description of the present exemplary embodiment, the clipping processing is executed after the Bayer interpolation processing. However, this should not be construed in a limiting sense. For example, the clipping processing can be executed before the shading correction processing or can be executed after CG combining processing described below. The clipping processing can be executed at a plurality of stages. For example, clipping may be executed for a first clipping size before the shading correction processing and clipping may be executed for a second clipping size after the Bayer interpolation processing. In such a configuration, the first clipping size is larger than the second clipping size.

The image combining unit 12 includes a CG rendering position calculation unit 122 and a CG combining unit 123. The CG rendering position calculation unit 122 performs image analysis in a plurality of received captured images to estimate a position/orientation of the HMD (that is, the image capturing units). The CG rendering position calculation unit 122 calculates a rendering position of the CG based on the position/orientation thus estimated. The CG combining unit 123 executes CG rendering on the captured images based on information on the rendering position obtained by the CG rendering position calculation unit 122.

The display unit 13 displays a combined image, where the CG is combined by the image combining unit 12, on displays 131 and 132 using display panels such a liquid crystal display (LCD) or an organic electroluminescence display (ELD). As described above, the HMD combines the CG with the two captured images with parallax captured by the two cameras 101 and 102, and displays the resultant combined image on the displays 131 and 132 respectively corresponding to the left and the right eyes of the user. Thus, the user can experience three dimensional (3D) vision and the MR.

Figure 2:
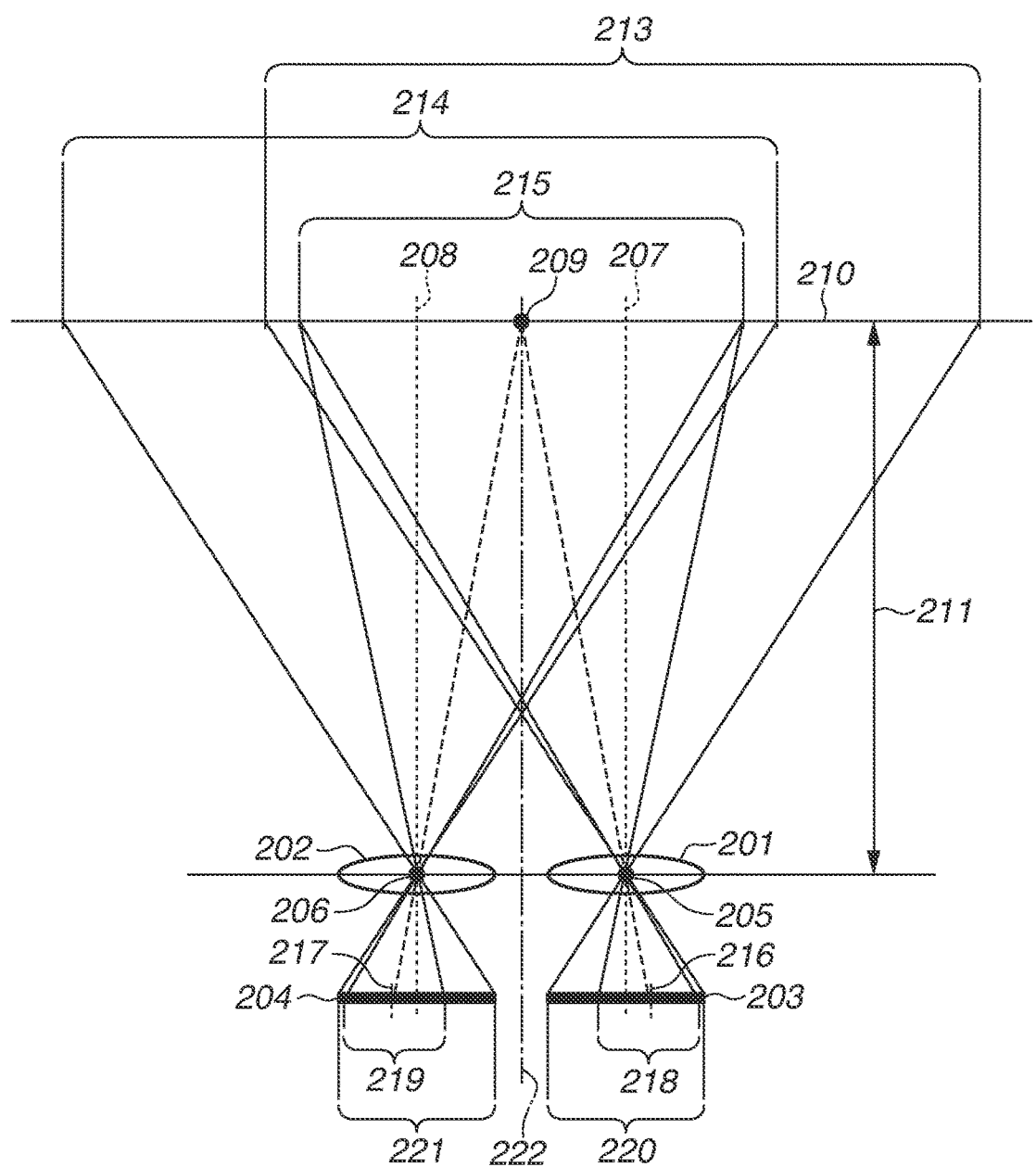
FIG. 2 is a diagram schematically illustrating a geometrical arrangement of image capturing units according to the first exemplary embodiment.

The arrangement of the cameras 101 and 102 of the image capturing unit 10 and a clipping position and the sizes of the display images with parallax for achieving 3D vision, according to the present exemplary embodiment, are described with reference to FIG. 2 and FIG. 3. FIG. 2 is a diagram schematically illustrating a geometrical arrangement of the image capturing unit 10 according to the present exemplary embodiment. FIG. 3 is a diagram illustrating relationship among the object, the captured image, and the display image, according to the present exemplary embodiment.

The cameras 101 and 102 according to the present exemplary embodiment respectively include image sensors 203 and 204 and imaging optical systems 201 and 202. Here, only the arrangement as viewed in an upper view of the HMD is described, and a description regarding a height direction is omitted for simplifying the description. The present exemplary embodiment employs the parallel viewing for capturing images with parallax. Thus, as illustrated in FIG. 2, the imaging optical systems 201 and 202 are arranged to have their optical axes 207 and 208 extending in parallel with each other. A point where an intermediate line 222 intersects with an object 210 is referred to as a vergence point 209. The intermediate line 222 extends toward the object 210 from an intermediate position of a line extending between principal points 205 and 206 of the imaging optical systems 201 and 202. A distance between the intermediate position and the vergence point 209 is referred to as a vergence distance 211.

The HMD according to the present exemplary embodiment is designed to have the base line length set to be 63 mm and the vergence distance set to be 1.4 m. The HMD is deigned to achieve the most natural 3D vision when the vergence point 209 is determined and the object is positioned at the vergence point 209. In the present exemplary embodiment, a 3D view area 215, in which 3D vision can be obtained, having the vergence point 209 at the center is set to be within an overlapping area between imaging ranges 213 and 214 of the image sensors 203 and 204, when the distance between the cameras 101 and 102 and the object 210 is the vergence distance.

In the present exemplary embodiment, effective image areas 220 and 221 of the image sensors 203 and 204 each have the center matching the optical axis of a corresponding one of the imaging optical systems 201 and 202. Captured images are output with an image of the object formed entirely over each of the effective image areas 220 and 221. The clipping units 115 and 116 execute the clipping processing with 3D view areas having centers set to be at points 216 and 217. The points 216 and 217 are points in the captured images formed on the image sensors 203 and 204, where the image sensors 203 and 204 intersect with lines extending between the vergence point 209 and the principal points 205 and 206. The 3D view areas correspond to image formation ranges (hereinafter "3D view areas") 218 and 219 on the image sensors 203 and 204. The clipping units 115 and 116 clip the 3D view areas 218 and 219 to be display images from the captured images. In other words, the clipping units 115 and 116 according to the present exemplary embodiment each clip a range having a center position different from the center of the imaging optical system as a clipping range.

Figure 3A:
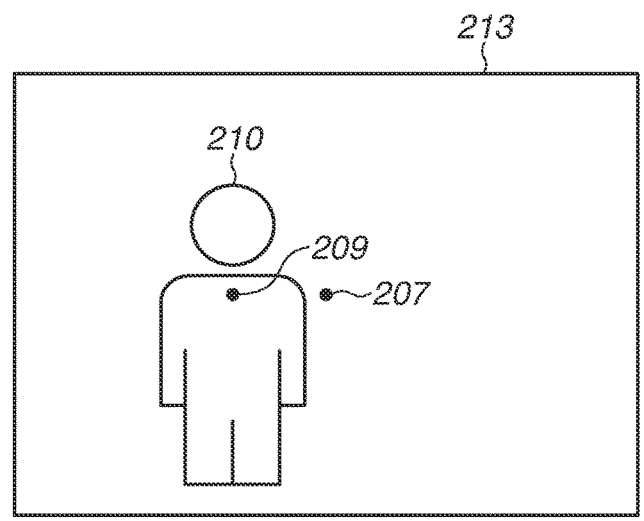
FIGS. 3A, 3B, and 3C are diagrams illustrating relationship among an object, a captured image and a display image.
Figure 3B:
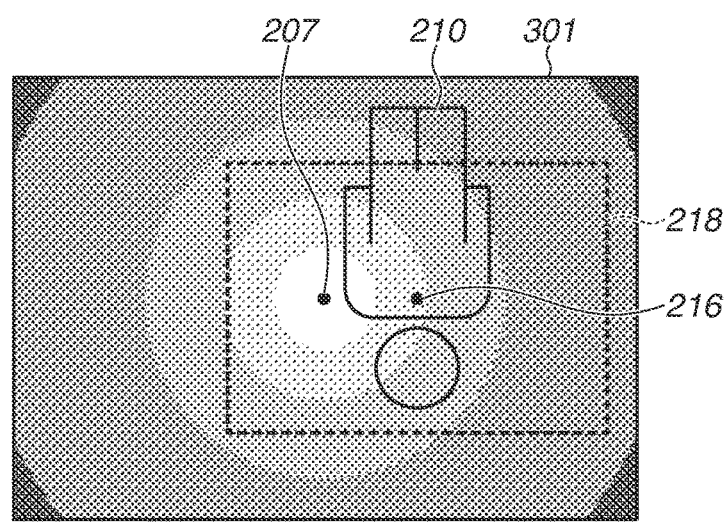

FIG. 3A illustrates relationship among the object 210 that is separated from the camera 101 by the vergence distance 211, the optical axis 207 of the camera 101, and the vergence point 209 in the range 213. FIG. 3B illustrates relationship among an image 301 of the object 210 illustrated in FIG. 3A, formed on the image sensor 203, the optical axis 207, the 3D view area 218, and the point (center) 216 of the 3D view area 218. Since an image formed on the image sensor 203 is an inverted image, the object 210 appears to be symmetrical about a point with respect to the optical axis 207. In the figure, vignetting is occurring due to the optical characteristics of the imaging optical system 201. As illustrated in FIG. 3B, the vignetting according to the present exemplary embodiment features a dimming amount continuously increasing as it gets farther from the optical axis 207 as a center.

Figure 3C:
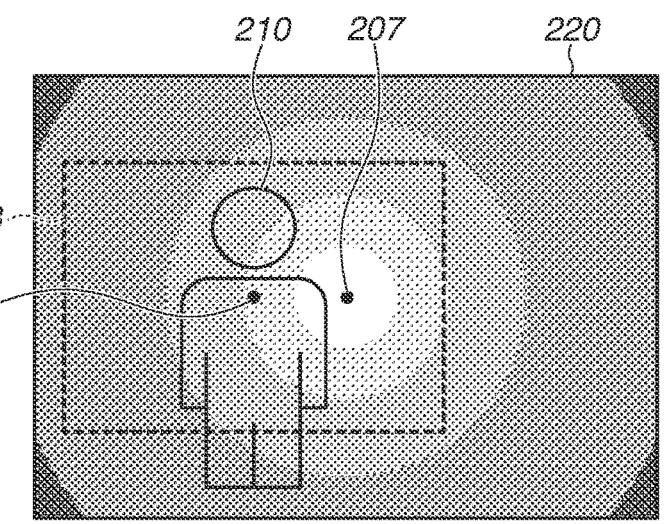

FIG. 3C illustrates relationship among the effective image area (captured image) 220 output from the image sensor 203, the 3D view area 218, and the point (center) 216 of the 3D view area 218. The captured image 220 is rotated to be an erect image output from the image sensor 203. As illustrated in FIG. 3C, the 3D view area 218, which is to be clipped as a display image, is shifted toward the intermediate line 222 from the optical axis 207 by an amount corresponding to the vergence distance, relative to the captured image 220. The same applies to the other camera 102. More specifically, the 3D view area 219, which is to be clipped as a display image, is shifted toward the intermediate line 222 from the optical axis 207, by an amount corresponding to the vergence distance. As described above, in the present exemplary embodiment, the clipping units 115 and 116 each clip, in a corresponding one of the left and the right captured images, a range having a center position different from the optical axis center of the corresponding imaging optical system, as a clipping range. The left and the right captured images are different from each other in the relative position of the clipping range with respect to the optical axis.

Figure 4:
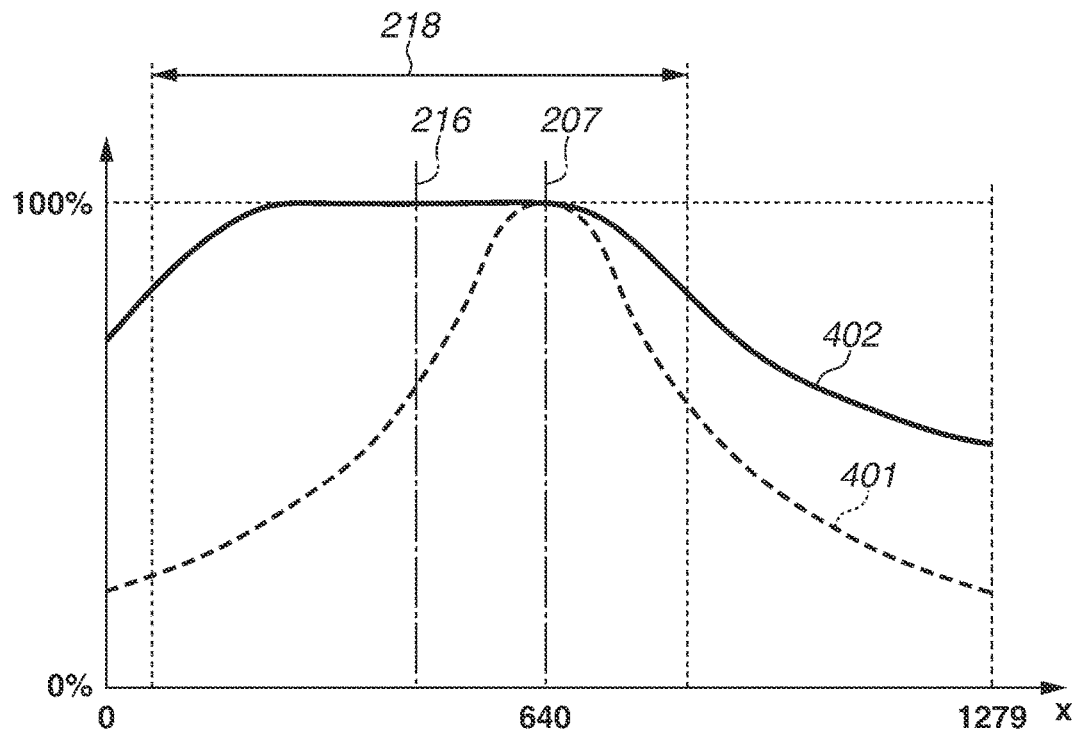
FIG. 4 is a diagram illustrating light quantity distribution on an imaging optical system and a captured image according to the first exemplary embodiment.
Figure 5:
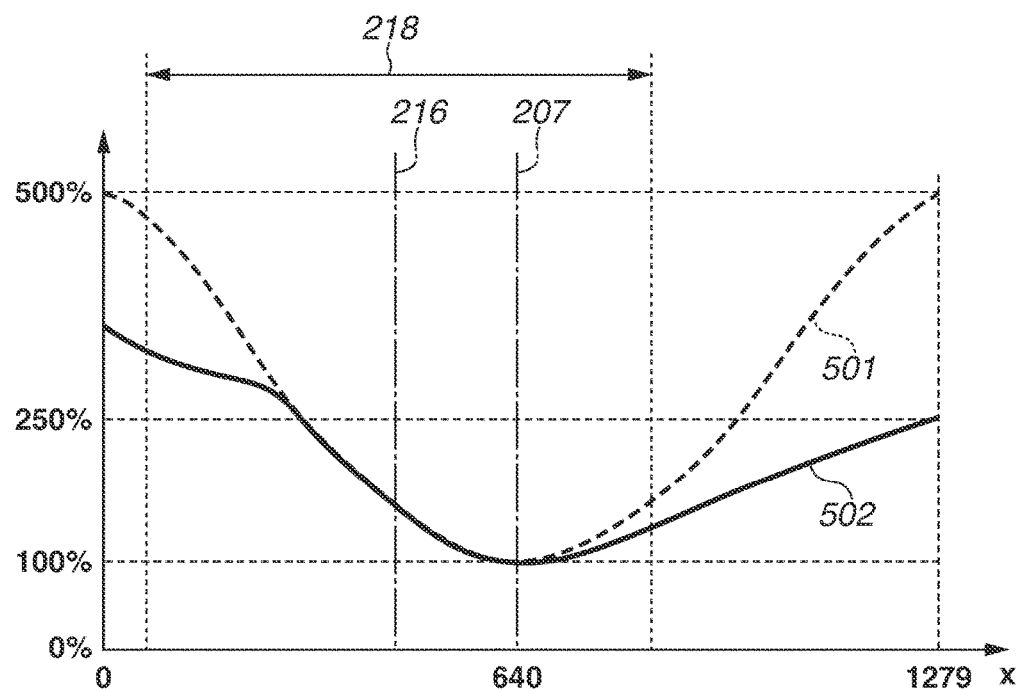
FIG. 5 is a diagram illustrating shading correction according to the first exemplary embodiment.

FIG. 4 is a diagram illustrating light quantity distribution on the imaging optical system and a captured image according to the present exemplary embodiment. FIG. 5 is a diagram illustrating shading correction according to the present exemplary embodiment. FIG. 4 illustrates a peripheral light quantity 401 of the imaging optical system 201 and light quantity distribution 402 as a result of the correction by the shading correction processing according to the present exemplary embodiment. The peripheral light quantity 401 in the figure indicates that the light quantity, which is 100% at the position of the optical axis 207 of the imaging optical system 201 according to the present exemplary embodiment, gradually decreases toward periphery to be at about 20% at edges.

FIG. 5 illustrates a gain 501 for pixels corresponding to view angle positions, in a case where the shading correction is executed to achieve the peripheral light quantity 401 being uniform over all the view angle positions. FIG. 5 also illustrates a gain 502 for pixels corresponding to view angle positions used in the shading correction processing according to the present exemplary embodiment. The gain 501 illustrated in the figure, which is obtained by shading correction according to a conventional technique, is at 100% for the view angle position corresponding to the optical axis 207. The gain gradually increases toward the periphery, and is specified to be 500% at the maximum. The increase in the gain involves increase in noise components in the captured image. Thus, the resultant image includes a much larger amount of noise at the periphery of the captured image than in a portion around the optical axis 207.

The shading correction according to the present exemplary embodiment results in the 100% light quantity in a range having the center matching the center 216 of the 3D view area 218 and a radius extending to the optical axis 207, as in the light quantity distribution 402. Thus, the shading correction according to the present exemplary embodiment can achieve a lower amount of noise than in the conventional technique.

The correction also results in the light quantity, corresponding to view angles outside the range having the center matching the center 216 of the 3D view area 218, gradually decreasing toward the periphery to be lower than 100%. In a range with the center matching the center 216 of the 3D view area 218 and the radius extending to the optical axis 207, the gain 502 is the same as the gain 501 for the correction to achieve 100% light quantity for all the view angle positions. For view angles outside the range, the gain 502 gradually becomes lower than the gain 501 toward the periphery.

In the present exemplary embodiment, the gain 502 is designed so that the light quantity does not fall below 100% for all the view angle positions to prevent the brightness of the captured image from compromising (thus, the gain of 100% or more is applied). The description on the camera 101 described above similarly applies to the other camera 102. More specifically, the shading correction processing is executed in such a manner that the light quantity is at 100% within the range having the center matching the center 217 of the 3D view area 219 and the radius extending to the optical axis 208. Accordingly, in the present exemplary embodiment, the shading correction processing is executed with the center position of the 3D view area serving as the center of each of the left and the right display images (clipping ranges).

Figure 6:
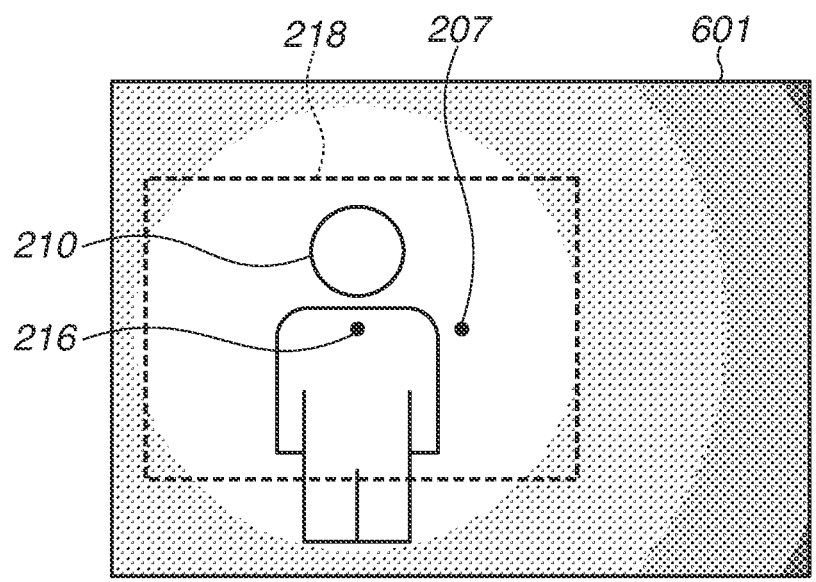
FIG. 6 is a diagram illustrating a display image after the shading correction according to the first exemplary embodiment.

FIG. 6 is a diagram illustrating relationship among the object, the captured image, and the display image, as a result of the shading correction processing according to the present exemplary embodiment. A captured image 601 is a result of executing the shading correction processing using the gain 502 on the captured image 220. As illustrated in FIG. 6, the vignetting is corrected by the shading correction processing so that the center 216 of the 3D view area 218 is set to be at the center. Further, the peripheral light quantity gradually decreases toward the periphery of the captured image 601 from the center 216 of the 3D view area 218.

The image processing apparatus according to the present exemplary embodiment clips from the captured image 601 the 3D view area 218 as a display image for the left eye, and the CG is rendered on the display image. After this processing, the combined image, on which the CG has been rendered, is transmitted to the HMD to be displayed on the display 131.

The shading correction processing according to the present exemplary embodiment uses a gain value set for each pixel corresponding to a view angle position. However, this should not be construed in a limiting sense. For example, discrete gain values can be set in such a manner that one gain value is set per a predetermined number of pixels. For a pixel position with no gain value, the gain value can be obtained through interpolation processing using adjacent gain values.

Figure 12:
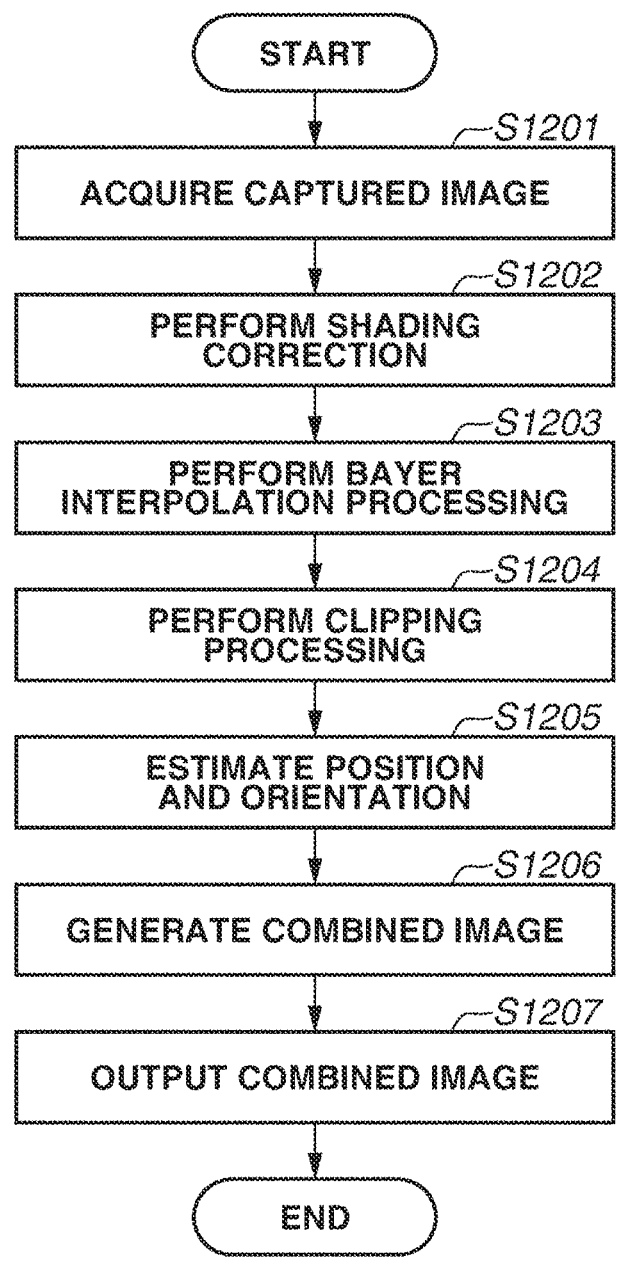
FIG. 12 is a flowchart illustrating an image processing method according to the first exemplary embodiment.

FIG. 12 is a flowchart illustrating image processing executed by the image processing apparatus according to the present exemplary embodiment in detail. In step S1201, the image processing unit 11 acquires captured images captured by the image capturing unit 10 (the cameras 101 and 102) of the HMD via an interface (I/F) of the image processing apparatus. In step S1202, the shading correction units 111 and 112 apply the gain corresponding to the view angle positions to the captured images captured by the shading correction units 111 and 112, to execute the shading correction processing for correcting the vignetting of the imaging optical systems. In the present exemplary embodiment, the shading correction is executed with the center 216 of the 3D view area 218 set to be at the center as described above.

In step S1203, the Bayer interpolation units 113 and 114 execute the Bayer interpolation processing. In step S1204, the clipping units 115 and 116 execute the clipping processing to generate display images enabling the user to experience 3D vision from the captured images. The clipping processing according to the present exemplary embodiment includes clipping the ranges, each having the center not matching the center of the imaging optical system, as the clipping ranges (display images).

In step S1205, the CG rendering position calculation unit 122 estimates the position/orientation of the HMD (the image capturing units), and calculates a CG rendering position. In step S1206, the CG combining unit 123 renders the CG on the captured images based on the rendering position thus calculated, to generate the combined image. In step S1207, the image combining unit 12 outputs the combined image to the HMD via the I/F of the image processing apparatus.

As described above, in the present exemplary embodiment, the display images generated (as a result of the clipping) from the captured images captured by the two left and right image capturing units have substantially the same light quantity distribution due to the shading correction processing. Thus, natural 3D vision can be achieved.

Now, a second exemplary embodiment of the present invention is described. In the first exemplary embodiment, the 3D view areas set in accordance with the vergence distance are clipped as left and right display images with parallax to be displayed on the displays 131 and 132, to enable the user to experience 3D vision and MR. In the present exemplary embodiment, an area further including a two-dimensional (2D) view area where no 3D vision can be obtained is clipped from a captured image to obtain a display image to be displayed, so that a large display view angle can be achieved. Components that have already been described in the first exemplary embodiment are denoted with the same reference numerals, and will not be elaborated here.

Figure 7:
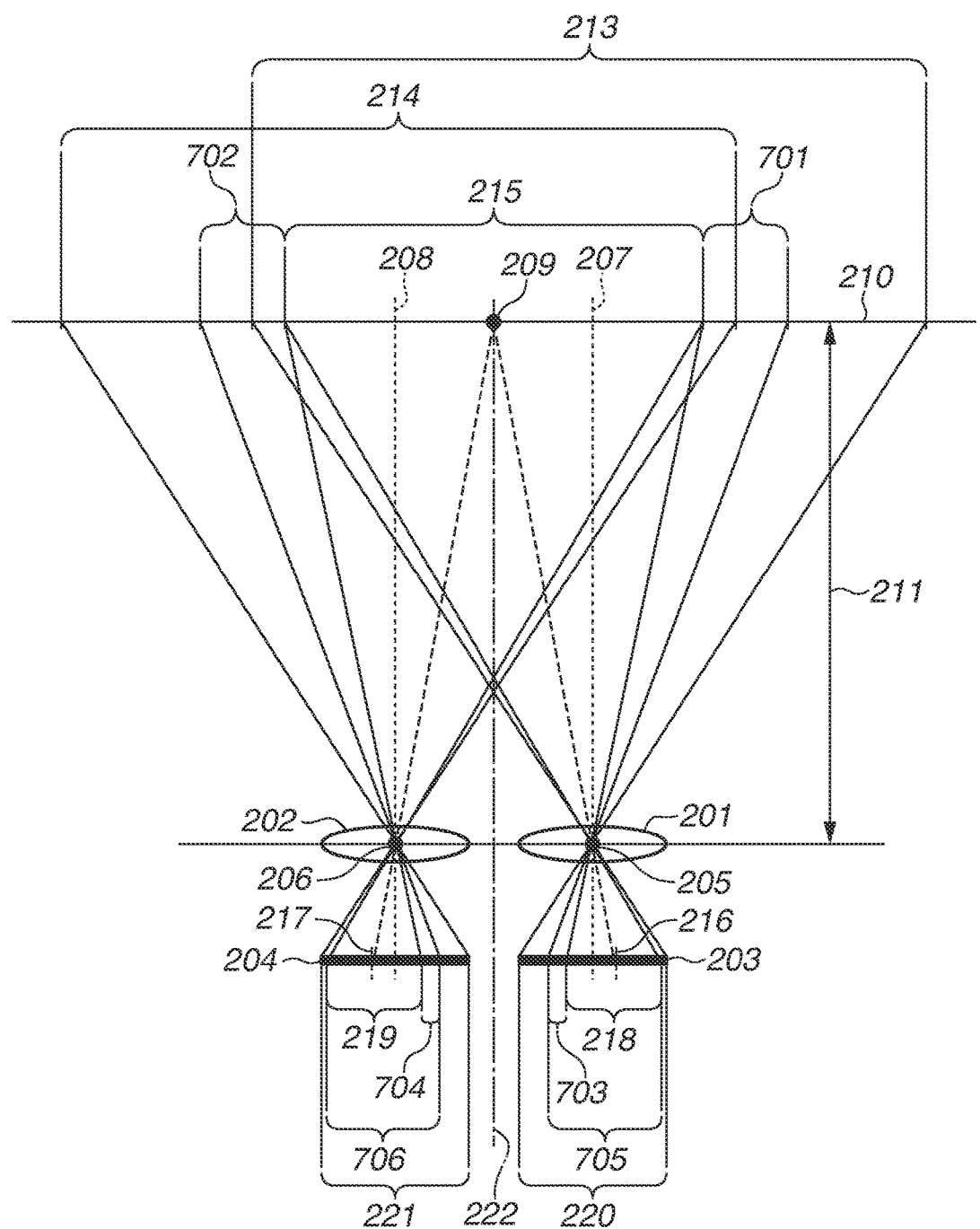
FIG. 7 is a diagram schematically illustrating a geometrical arrangement of image capturing units according to a second exemplary embodiment.

FIG. 7 is a diagram schematically illustrating a geometrical arrangement of the image capturing unit 10 according to the present exemplary embodiment. In the present exemplary embodiment, the 3D view area 215 having the vergence point 209 at the center is set to be within an overlapping area between the imaging ranges 213 and 214 of the image sensors 203 and 204, with the vergence distance 211, as in the first exemplary embodiment. Further, 2D view areas 701 and 702 where no 3D vision can be obtained are set to continue from the 3D view area 215 and to extend in directions away from the intermediate line 222. The 2D view area according to the present exemplary embodiment is an area in which an object separated by the vergence distance is to be included in an image captured by only one of the cameras. The captured images formed on the image sensors 203 and 204 respectively include 3D view areas 218 and 219 and 2D view areas 703 and 704. The clipping units 115 and 116 according to the present exemplary embodiment respectively clip, from the captured images, ranges 705 and 706, each including the 3D view area and the 2D view area to obtain display images.

Figure 8:
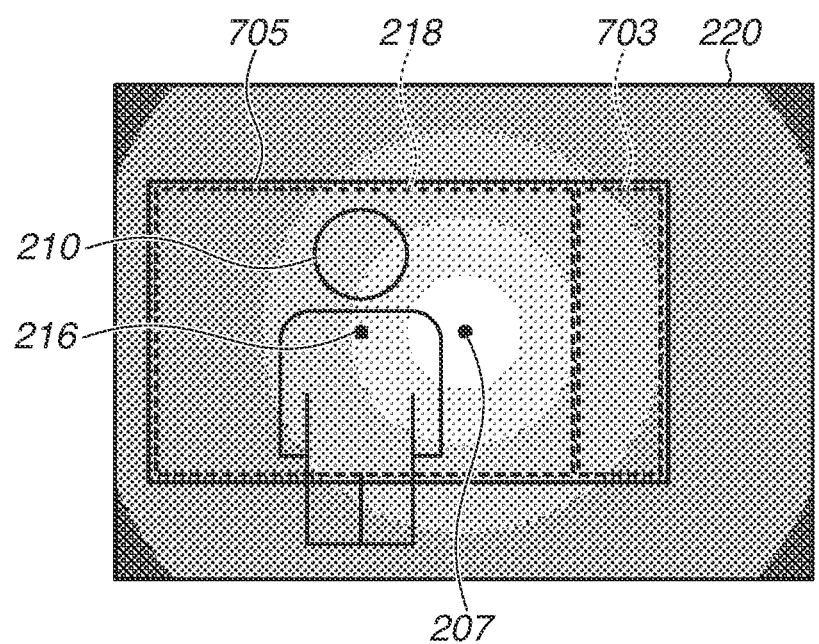
FIG. 8 is a diagram illustrating relationship between a captured image and a display image according to the second exemplary embodiment.

FIG. 8 is a diagram illustrating relationship between the captured image and the display image according to the present exemplary embodiment. FIG. 8 illustrates relationship among the captured image 220 output from the image sensor 203, the 3D view area 218, the center 216 of the 3D view area 218, the 2D view area 703, and the range (display image) 705. The image sensor 203 outputs the captured image 220 that is an erect image. As illustrated in FIG. 8, the range 705 clipped to be the display image includes the 3D view area 218 and the 2D view area 703. The 3D view area 218 is an area shifted toward the intermediate line 222 from the optical axis 207 by an amount corresponding to the vergence distance relative to the captured image 220. The 2D view area 703 continues from the 3D view area 218 and extends in the direction away from the intermediate line 222. The same applies to the other camera 102. More specifically, the 3D view area 219 to be clipped to be the display image is shifted toward the intermediate line 222 from the optical axis 207 by an amount corresponding to the vergence distance. The 2D view area 706 continues from the 3D view area 219 and extends in the direction away from the intermediate line 222.

Figure 9:
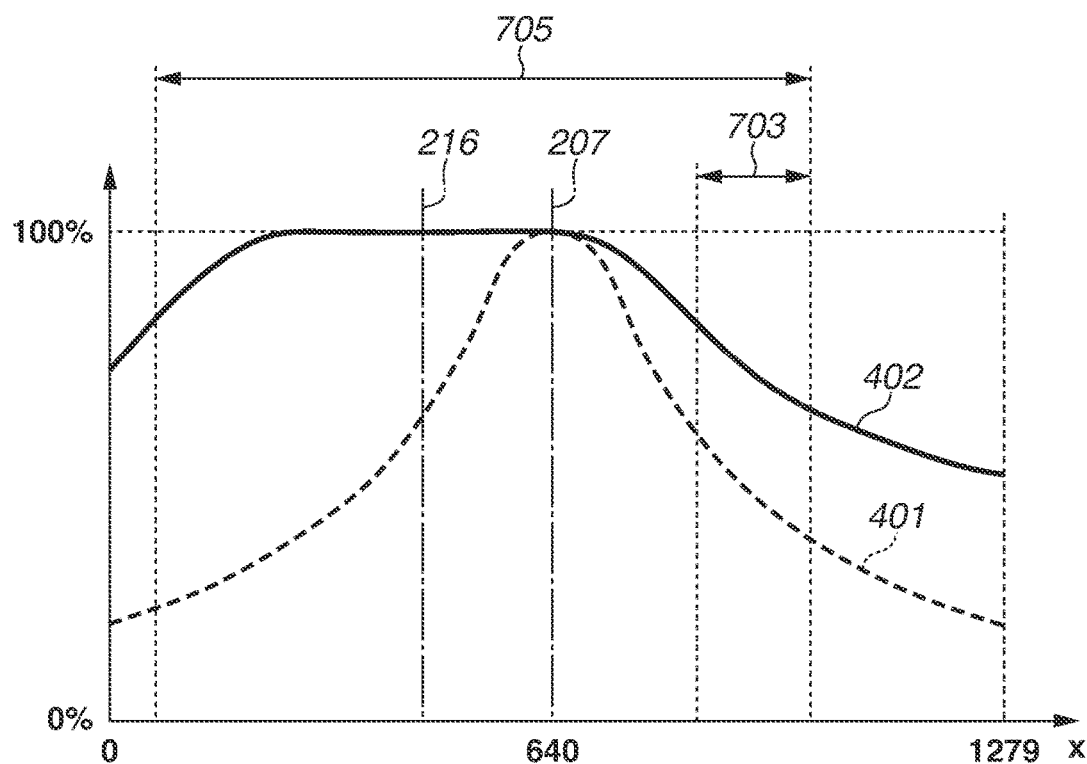
FIG. 9 is a diagram illustrating light quantity distribution on an imaging optical system and a captured image according to the second exemplary embodiment.
Figure 10:
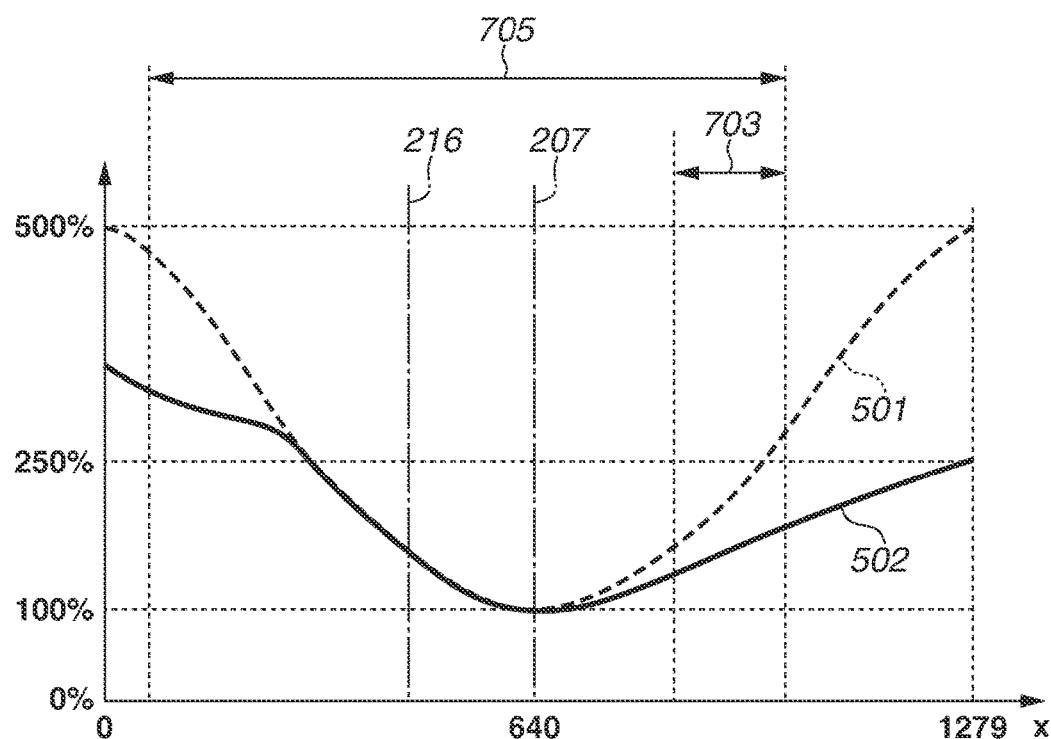
FIG. 10 is a diagram illustrating shading correction according to the second exemplary embodiment.

The shading correction processing executed by the shading correction units 111 and 112 according to the present exemplary embodiment is described in detail with reference to FIG. 9, FIG. 10, and FIG. 11. FIG. 9 is a diagram illustrating a peripheral light quantity on the imaging optical system according to the present exemplary embodiment and light quantity distribution of the captured image as a result of the correction by the shading correction processing according to the present exemplary embodiment. FIG. 10 is a diagram illustrating a gain used in the shading correction processing according to the present exemplary embodiment. An example where light quantity distribution is sliced at a horizontal position to pass through the optical axis of the captured image and the center of the 3D view area is described, to simplify the description.

In the present exemplary embodiment as well, the correction is performed to achieve the light quantity distribution 402, that is, to achieve the 100% light quantity in the range having the center matching the center 216 of the 3D view area and the radius extending to the optical axis 207, as in the first exemplary embodiment. The 2D view area 703 is included for view angles outside the above range, with the center matching the center 216 of the 3D view area. The correction is performed in such a manner that the light quantity gradually decreases toward the periphery in this 2D view area 703 to be lower than 100%. As illustrated in the figure, the gain 502 is the same as the gain 501 for correction to achieve the 100% light quantity for all the view angle positions, in the range having the center matching the center 216 of the 3D view area and the radius extending to the optical axis 207. In a range including view angles outside the above range including the 2D view area 703, the gain gradually becomes lower toward the periphery. The correction is performed in such a manner that, in the range 705 clipped to be the display image, the light quantity in the 2D view area becomes lower than that in the 3D view area, when the light quantity distribution after the shading correction processing is sliced at certain positions.

In the present exemplary embodiment, the gain 502 is designed so that the light quantity does not fall below 100% for all the view angle positions to prevent the brightness of the captured image from impairing. The description on the camera 101 described above similarly applies to the camera 102. More specifically, the shading correction processing is executed to achieve the 100% light quantity in the range with the center matching the center 217 of the 3D view area the radius extending to the optical axis 208.

Figure 11:
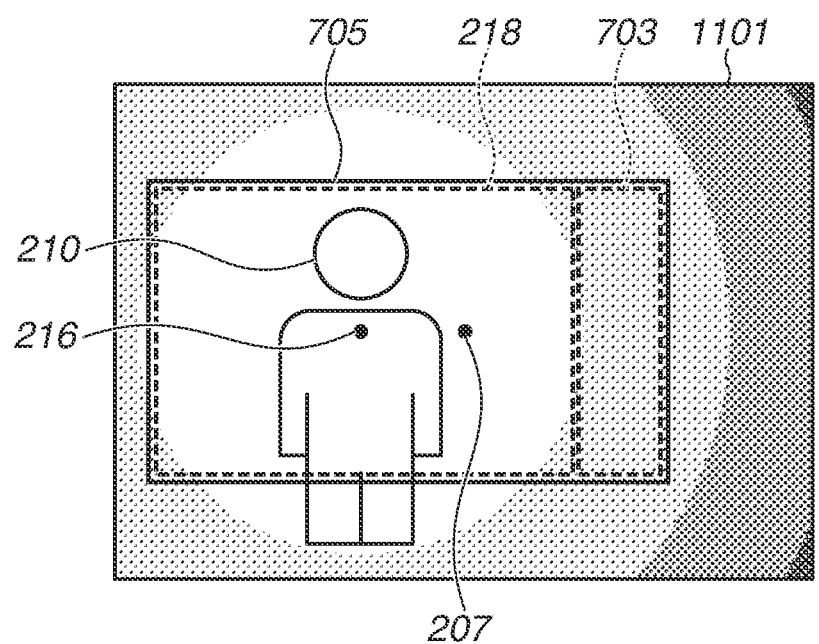
FIG. 11 is a diagram illustrating a display image after the shading correction according to the second exemplary embodiment.

FIG. 11 is a diagram illustrating relationship among the object, the captured image, and the display image after the shading correction processing according to the present exemplary embodiment. A captured image 1101 is a result of executing the shading correction processing, using the gain 502, on the captured image 220. As illustrated in FIG. 11, the shading correction processing results in the vignetting corrected in such a manner that the center 216 of the 3D view area is set to be at the center. Further, it can be seen in the figure that the peripheral light quantity gradually decreases toward the periphery of the captured image 1101 from the center 216 of the 3D view area. The image processing apparatus according to the present exemplary embodiment clips, from the captured image 1101, the range 705 including the 3D view area 218 and the 2D view area 703 through the clipping processing. Thus, the display image for the left eye is obtained. Then, the combined image in which the CG is rendered on the display image is generated. The combined image thus generated is transmitted to the HMD to be displayed on the display 131 of the HMD.

The shading correction processing according to the present exemplary embodiment uses the gain value set for each pixel corresponding to the view angle position. However, this should not be construed in a limiting sense. For example, as described in the first exemplary embodiment, the discrete gain values can be set in such a manner that one gain value is set per the predetermined number of pixels. For the pixel position with no gain value, the gain value can be obtained through interpolation processing using the adjacent gain values.

According to the present exemplary embodiment described above, the shading correction processing can achieve the left and the right 3D view areas having substantially the same light quantity distribution, in which 3D vision can be obtained, without excessively increasing noise. Thus, natural 3D vision can be achieved.

With the configurations according to the embodiments of the present invention described above, a difference between display images generated from images captured by two image capturing units in light quantity distribution can be reduced.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-027294, filed Feb. 16, 2017, which is hereby incorporated by reference herein in its entirety.

What is claimed is:

1. An image processing apparatus comprising:
a memory storing a program; and
at least one processor, by executing the program, functioning as:
an acquisition unit configured to acquire a first captured image and a second captured image respectively captured by a first capturing unit and a second capturing unit arranged with different optical axes to reproduce left-right parallax, the first captured image and the second captured image each including an image of a captured object;
a correction unit configured to execute shading correction on the first captured image and the second captured image, wherein a center of light quantity distribution in the first captured image after the shading correction shifts for the optical axis of the first capturing unit, and a center of light quantity distribution in the second captured image after the shading correction shifts for the optical axis of the second capturing unit, and shift directions of the first captured image and the second captured image are opposite to each other;
a clipping unit configured to clip areas from the first captured image and the second captured image as a first display image and a second display image, wherein each of the clipped areas has a center different from the optical axes, and a relative position of the area clipped as the first display image with respect to the optical axis of the first capturing unit corresponds to the center of light quantity distribution in the first captured image and a relative position of the area clipped as the second display image with respect to the optical axis of the second capturing unit corresponds to the center of light quantity distribution in the second captured image; and a generation unit configured to combine a virtual object with the first display image and the second display image to generate parallax images including the virtual object, wherein the clipping unit clips the first display image and the second display image to each include a three-dimensional view area where the user views the captured object in three dimensions.

2. The image processing apparatus according to claim 1, wherein the optical axes of the first capturing unit and the second capturing unit are in parallel with each other.

3. The image processing apparatus according to claim 1, wherein the correction unit executes the shading correction in such a manner that a light quantity decreases toward a periphery from the center of the three-dimensional view area.

4. The image processing apparatus according to claim 1, wherein the correction unit executes the shading correction by applying a gain value of 100% or more.

5. The image processing apparatus according to claim 1, wherein the correction unit executes the shading correction on the first captured image and the second captured image based on discrete gain values each set per a predetermined number of pixels.

6. The image processing apparatus according to claim 5, wherein the correction unit executes the shading correction based on the discrete gain values and gain values obtained by executing interpolation processing on the discrete gain values.

7. The image processing apparatus according to claim 1, wherein the clipping unit clips the first display image and the second display image in such a manner that the first display image and the second display image each further include a two-dimensional view area where the user views the captured object in two dimensions.

8. The image processing apparatus according to claim 7, wherein the correction unit executes the shading correction in such a manner that a light quantity is set to be lowest in the two-dimensional view area.

9. The image processing apparatus according to claim 1, wherein the correction unit executes correction in such a manner that a 100% light quantity is obtained in the area including the center of each of the clipped first display image and the clipped second display image and each of the optical axes.

10. The image processing apparatus according to claim 1, wherein the parallax images including the virtual object are output to an image display device including a first display unit and a second display unit that respectively display the first display image and the second display image.

11. The image processing apparatus according to claim 10, wherein the image display device includes the first capturing unit and the image capturing unit.

12. The image processing apparatus according to claim 10, wherein the image display device is a head-mounted image display device.

13. The image processing apparatus according to claim 1, wherein the three-dimensional view areas are set to be within an overlapping area between imaging ranges of the first capturing unit and the second capturing unit.

14. The image processing apparatus according to claim 1, wherein the light quantity distributions in the first display image the second display image after the clipping are substantially the same.

15. The image processing apparatus according to claim 1, wherein light quantity distributions in the three-dimensional view areas of the first display image the second display image after the clipping are substantially the same.

16. The image processing apparatus according to claim 1, wherein the shading correction on the first captured image is executed in such a manner that a light quantity within a range having a center corresponding to a center of the three-dimensional view area of the first display image and having a radius extending to the optical axis of the first capturing unit is the largest, and the shading correction on the second captured image is executed in such a manner that a light quantity within a range having a center matching a center of the three-dimensional view area of the second display image and having a radius extending to the optical axis of the second capturing unit is the largest.

17. Am image processing system comprising:
a memory storing a program; and
at least one processor, by executing the program, functioning as:
a first capturing unit and a second capturing unit having different optical axes and respectively corresponding to a left eye and a right eye of a user, the first capturing unit being configured to capture a first captured image and the second capturing unit being configured to capture a second captured image, each of the first and second captured images including an image of a captured object;
a correction unit configured to execute shading correction on the first captured image and the second captured image, wherein a center of light quantity distribution of the first captured image after the shading correction shifts for the optical axis of the first capturing unit, and a center of light quantity distribution of the second capturing unit shifts for the optical axis of the second capturing unit, and shift directions of the first captured image and the second captured image are opposite to each other;
a clipping unit configured to clip areas of the first captured image and the second captured image as a first display image and a second display image, wherein each of the clipped areas has a center different from the optical axes, and a relative position of the area clipped as the first display image with respect to the first capturing unit corresponds to the center of the light quantity distribution in the first captured image and a relative position of the area clipped as the second display image with respect to the optical axis of the second capturing unit corresponds to the center of light quantity distribution in the second captured image; and
a generation unit configured to combine a virtual object with the first display image and the second display image to generate parallax images including the virtual object,
wherein the clipping unit clips the first display image and the second display image to each include a three-dimensional view area where the user views the captured object in three dimensions.

18. An image processing method comprising:
acquiring a first captured image and a second captured image and a second captured image respectively captured by a first capturing unit and a second capturing unit arranged with different optical axes to reproduce left-right parallax, the first captured image and the second captured image each including an image of captured object, executing shading correction on the first captured image and the second captured image, wherein a center of light quantity distribution in the first captured image after the shading correction shifts for the optical axis of the first capturing unit, and a center of light quantity distribution of the second captured image after the shading correction shifts for the optical axis of the second capturing unit, and shift directions of the first captured image and the second captured image are opposite to each other;

clipping areas from the first captured image and the captured display image as a first display image and a second display image, wherein each of the clipped areas has a center different from the optical axes, and a relative position of the area clipped as the first display image with respect to the optical axis of the first capturing unit corresponds to the center of light quantity distribution in the first captured image and a relative position of the area clipped as the second display image with respect to the optical axis of the second capturing unit corresponds to the center of light quantity distribution in the second captured image; and combining a virtual object with the first display image and the second display image to generate parallax images including the virtual object, wherein the clipping includes clipping the first display image and the second display image to each include a three-dimensional view area where the user views the captured object in three dimensions.

19. A non-transitory computer-readable storage medium storing therein a program for causing a computer to execute an image processing method, the image processing method comprising:

acquiring a first captured image and a second captured image and a second captured image respectively captured by a first capturing unit and a second capturing unit arranged with different optical axes to reproduce left-right parallax, the first captured image and the second captured image each including an image of captured object, executing shading correction on the first captured image and the second captured image, wherein a center of light quantity distribution in the first captured image after the shading correction shifts for the optical axis of the first capturing unit, and a center of light quantity distribution of the second captured image after the shading correction shifts for the optical axis of the second capturing unit, and shift directions of the first captured image and the second captured image are opposite to each other;

clipping areas from the first captured image and the captured display image as a first display image and a second display image, wherein each of the clipped areas has a center different from the optical axes, and a relative position of the area clipped as the first display image with respect to the optical axis of the first capturing unit corresponds to the center of light quantity distribution in the first captured image and a relative position of the area clipped as the second display image with respect to the optical axis of the second capturing unit corresponds to the center of light quantity distribution in the second captured image; and combining a virtual object with the first display image and the second display image to generate parallax images including the virtual object, wherein the clipping includes clipping the first display image and the second display image to each include a three-dimensional view area where the user views the captured object in three dimensions.

* * * * *